April 14, 1953 J. J. MADDEN 2,635,230

LINEAR DIAL CALL TRANSMITTER

Filed Nov. 13, 1950

INVENTOR
J. J. MADDEN
BY
ATTORNEY

Patented Apr. 14, 1953 2,635,230

UNITED STATES PATENT OFFICE 2,635,230

LINEAR DIAL CALL TRANSMITTER

James J. Madden, New York, N. Y., assignor to Bell Telephone Laboratories, Incorporated, New York, N. Y., a corporation of New York Application November 13, 1950, Serial No. 195,209

1 Claim. (Cl. 340—365)

This invention relates to telephone call transmitters and, more specifically, to call transmitters of the linear or pull-down dial type.

Linear dialing mechanisms have been proposed heretofore in conjunction with call transmitters of the preset type. These devices comprised a series of coaxial cylinders with symbols arranged circumferentially thereon, the cylinders being rotated through the appropriate angles corresponding to the symbols in the selection process. Such devices are cumbersome and mechanically involved, and the advantages thereover of call transmitters of the impulse sending type are well known.

Impulse sending transmitters are usually actuated by a dial which is rotated through angles determined by holes associated with appropriate symbols. The motion required of the hand in actuating the dial is a rotational motion, which is somewhat unnatural and is relatively time consuming. Further, the arrangement of corresponding symbols and holes circumferentially about the dial restricts the range of angles of view from which all of the symbols are clearly visible, whereby a source of possible error in the selection or dialing process is introduced.

One general object of this invention is to improve telephone call transmitters.

A more specific object of this invention is to simplify the operation of telephone call transmitters.

A further object of this invention is to provide a dialing device which reduces the travel distance of the hand in the actuating process, thus reducing the time consumed in the selection process.

Yet another object is to provide a dialing device which reduces the possibility of error in the selection process.

A still further object is to increase the legibility of the indicia or symbols included in the dialing device.

In one illustrative embodiment of the invention, a call transmitter comprises a pair of plates, one fixed and having symbols thereon and the other movable and having therein apertures arranged in the same pattern as the symbols, an impulse sending device, and a coupling between the device and the movable plate, whereby the device is actuated in accordance with movement of this plate.

In accordance with one feature of this invention, the movable plate is mounted for linear actuation. More specifically, in accordance with one feature of this invention, the symbols on the fixed plate and the corresponding holes in the movable plate are arranged in columns and rows, the motion of the movable plate being reciprocal and in the direction of the columns of symbols.

In accordance with another feature of this invention, the fixed and movable plates are in the form of segments of coaxial cylinders, and the movable plate is mounted for rotational movement about the axis thereof.

The invention, together with the various features thereof, will be more fully understood from the following detailed description with reference to the accompanying drawing, in which.

Figures 1, 2, 3:
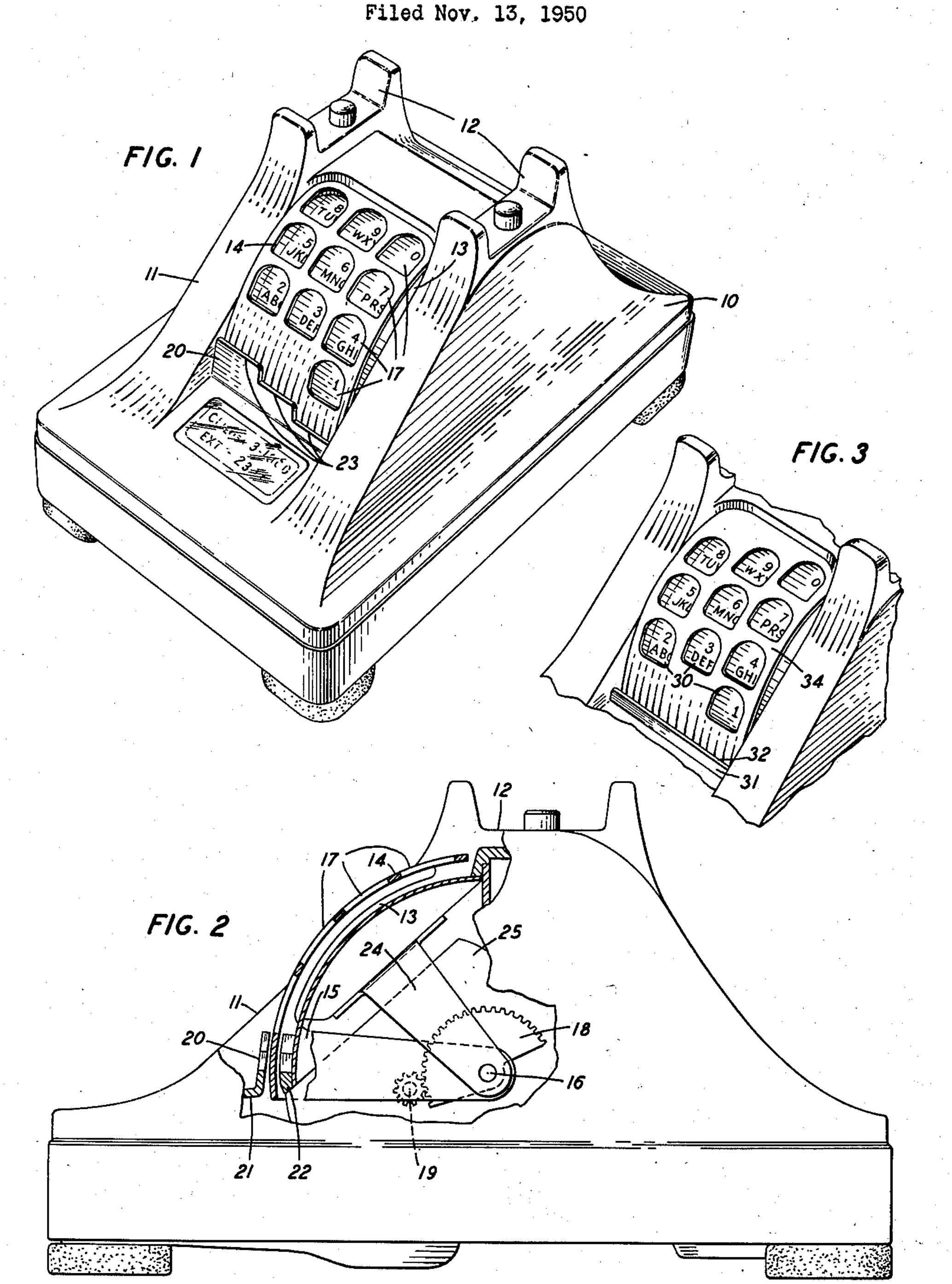
Fig. 1 is a perspective view of a telephone support or mounting including a dial mechanism illustrative of one embodiment of this invention.
Fig. 2 is a side view partially in the section of the support shown in Fig. 1.
Fig. 3 is a fragmentary perspective view of a dial having a different arrangement of the finger holes and corresponding symbols.

Referring to the drawing, a telephone support 10 having a sloping front portion 11 includes tines defining a cradle 12 for receiving a telephone handset, not shown. Situated in an aperture in the front portion 11 and fastened to the support, for example, by nuts and screws, is a segmentary cylindrical plate 13.

A second segmentary cylindrical plate 14 attached to the brackets 15, as by welding, is pivoted about the shaft 16, which in turn is supported by brackets 24 which are attached to the telephone support 10, e. g., by screws and nuts. The geometric axis of the shaft 16 is coincident with the axes of both the movable cylindrical plate 14 and the fixed cylindrical plate 13.

Ten finger holes 17 arranged in four rows and three columns in the movable plate 14 correspond to ten symbols or groups thereof imprinted upon the surface of the fixed segmentary cylindrical plate 13.

The movable cylindrical plate 14 is coupled through the brackets 15, the shaft 16, the gear 18, and the gear 19 to a suitable impulse sending device 25, which may be, for example, of the construction disclosed in the application Serial No. 21,618, filed April 17, 1948, of H. R. Clarke et al., now Patent 2,563,581. In the illustrative embodiment of the invention shown, the ratio of the gears 18 and 19 is five to one; hence, for any given symbol, the angular travel distance of the plate 14 is one-fifth the angular travel distance of the dial of the device disclosed in the application noted hereinabove.

A stepped finger stop 20 is comprised of the stepped plate 21 which is external to the movable cylindrical plate 14 and the stepped plate 22, similar to the plate 21, which is situated between the movable cylindrical plate 14 and the fixed cylindrical plate 13. The finger stop plates are fastened to the telephone support by appropriate means such as welding or screws and nuts. The steps 23 in the stepped finger stop correspond to the columns of finger holes 17.

The impulse sending device is actuated as follows: the finger is inserted in one of the holes 17 in the movable cylindrical plate 14 and the plate moved until the finger engages the finger stop corresponding to the column of the hole selected. The plate is then released by the withdrawal of the finger and returned to the original position by a spring or other means, not shown, which may be a part of the impulse sending device 25.

It will be noted that because of the disposition of the symbols in columns and rows, short strokes or travel distances for the finger in the dialing process are realized. Furthermore, such disposition of the symbols provides a large range of angles of view for all the symbols whereby the probability of error in the selection and dialing operation is reduced.

Although the illustrative embodiment of this invention shown in Figs. 1 and 2 provides ten finger holes with corresponding symbols, it is understood that this invention may be employed with a different number of finger holes arranged similarly in a plurality of rows and colums or, for that matter, arranged in any arbitrary manner. For example, Fig. 3 shows one of the possible arrangements of the finger holes and associated symbols or indicia. By stepping the columns of finger holes 30 a finger stop 31 having a straight edge 32 gives the required variation in the amplitude of the motion of the movable plate 34 associated with various symbols.

Although specific embodiments of the invention have been shown and described it will be understood that they are but illustrative and that various modifications may be made therein without departing from the scope and spirit of the invention as defined by the appended claim.

What is claimed is:

A telephone mounting comprising a housing including a front wall having an aperture therein, an impulse transmitting device within said housing, a first arcuate plate attached to said housing and substantially closing said aperture except for a slot at one horizontal edge of said aperture, said plate having thereon a series of indicia arranged in a series of columns, the indicia in adjacent columns being aligned, a second arcuate plate overlying said first plate and having therein a series of finger holes, one for each of said indicia, said second plate being positioned to enter said housing through said slot, means including a bracket coupled to one end of said second plate, mounting said second plate for reciprocal movement over said first plate in the direction parallel to said columns, means coupling said second plate to said impulse transmitting device, a first finger stop on said housing and immediately adjacent and overlying said second plate adjacent said slot, said first finger stop having a series of discrete portions, one for each of said columns and arranged in stepped array, and a second finger stop having discrete portions corresponding to those of said first finger stop, said second finger stop closely underlying said second plate adjacent said slot and conforming substantially to the curve of said second plate.

JAMES J. MADDEN.

References Cited in the file of this patent

UNITED STATES PATENTS

| Number | Name | Date |
|---|---|---|
| 2,503,542 | Brander | Apr. 11, 1950 |
| 2,543,080 | Wagner | Feb. 27, 1951 |

FOREIGN PATENTS

| Number | Country | Date |
|---|---|---|
| 366,408 | Great Britain | Feb. 4, 1932 |